ENCODER-DECODER DEVICE FOR SELECTIVE SIGNALING
Filed Oct. 16, 1962
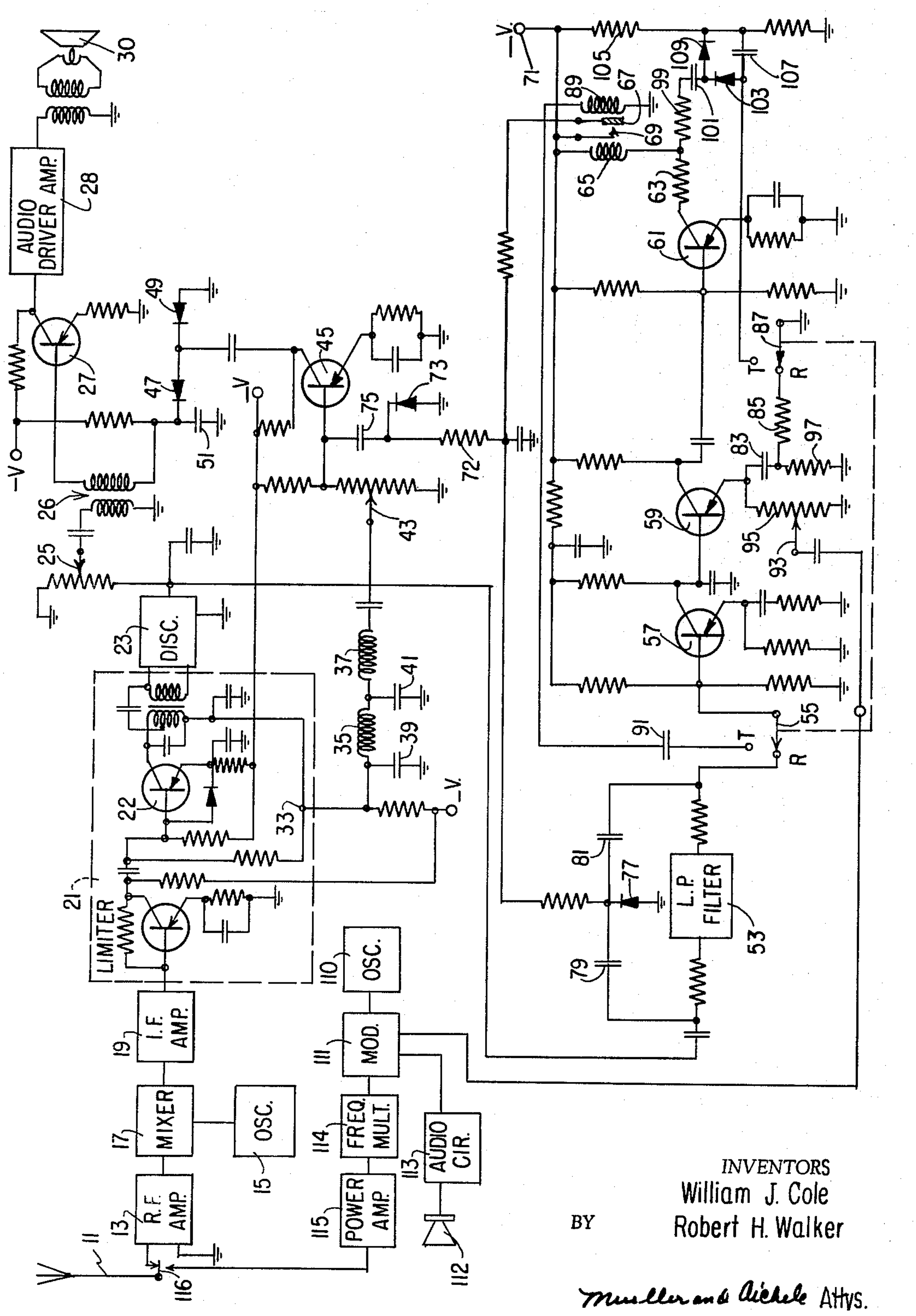
INVENTORS
William J. Cole
Robert H. Walker
BY Mueller and Aichele Attys.

United States Patent Office 3,250,997

Patented May 10, 1966

3,250,997

ENCODER-DECODER DEVICE FOR SELECTIVE SIGNALING

William J. Cole, Chicago, and Robert H. Walker, Morton Grove, Ill., assignors to Motorola, Inc., Chicago, Ill., a corporation of Illinois Filed Oct. 16, 1962, Ser. No. 230,880
8 Claims. (Cl. 325—18)

This invention relates to two-way radio transmitting and receiving equipment and more particularly to a combination encoder-decoder system for two-way radio equipment adapted for coded tone operation.

Two-way portable radio equipment providing both transmitting and receiving functions in a single unit require simple and dependable circuitry in the form of a compact and rugged unit. Optimum portability necessitates that the equipment be small and light in weight for easy handling. The difficulties in achieving these optimum conditions are increased when additional facilities are required, as in coded tone systems in which the receivers are responsive only to messages transmitted in connection with a coded tone of a given frequency. Coded tone operation requires a tone source, such as an oscillator, for the transmitting or encoder function, to provide the tone of given frequency which is transmitted to the receivers; and further requires a frequency responsive device in each receiver that will cause the receiver in which it is incorporated to operate upon receipt of the coded tone signal. These operations have been provided by separate circuits as shown in Patent No. 2,918,571.

Accordingly, it is an object of this invention to provide a two-way portable radio unit adapted for coded tone operation in which the encoder and decoder systems are combined by simple circuitry.

Another object of the invention is to provide a simple and inexpensive combination encoder-decoder, for a two-way portable radio, which occupies a minimum of space and provides dependable operation.

A further object of the invention is to provide a low cost combination encoder-decoder system for a two-way portable radio unit wherein the amplifier of the encoder oscillator functions to amplify the received tones in the decoder.

A feature of the invention is the provision of a combination encoder-decoder system for a two-way radio unit including a switch for connecting a feedback circuit to an amplifier and selective device to provide oscillations, and for alternatively connecting the receiver audio to the amplifier and selective device to amplify and select received tone signals.

Another feature of the invention is the provision of a bias network in the above mentioned amplifier so connected that a control switch may be coupled to permit the tapping off of coded tone output during encoder operation without detrimentally affecting the operation of the amplifier.

Still another feature of the invention is the provision in the described system of a switch to cut in an automatic gain control circuit during encoder operation.

In the drawing there is depicted a schematic diagram of a portion of a two-way radio transmitter and receiver unit constructed in accordance with the invention.

The invention utilizes a single frequency virbatory device (such as a reed unit or a tuning fork) with associated coils for driving and sensing the vibrations of the device. A three-stage cascaded grounded emitter transistor amplifier is provided for supplying current to the driving coil. Connection is made from the sensing coil of the vibratory device to the amplifier to provide oscillator feedback for encoder operation. A switch connected to the input of the amplifier permits selective application of feedback signals, or received radio signals from the receiver portion of the radio, for encoder or decoder operation respectively. During decoder operation the middle stage of the amplifier is grounded through a low impedance circuit. Provision is made to switch out this low impedance circuit on conversion from decoder to encoder operation, providing a high impedance emitter path for the middle stage so that tone output may be tapped off without effecting the operation of this stage. In addition, as the system is switched to encoder operation, further provision is made to connect a delayed automatic gain control circuit to the amplifier. This permits rapid attainment of usable amplitude by the oscillator, and then controls the driving current applied to the drive coil of the vibratory device.

Referring now to the drawing, the combination encoder-decoder system is shown in a two-way radio transmitter-receiver system. Radio frequency signals are applied from antenna 11 to radio frequency amplifier 13, heterodyned against oscillations from oscillator 15 in mixer 17 to produce intermediate frequency signals, and then amplified in intermediate frequency amplifier 19. The amplified intermediate frequency signals are then applied to a two-stage limiter 21, and the constant amplitude output of the limiter is applied to discriminator 23. Audio frequency signals from discriminator 23 are applied through volume control 25 and transformer 26 to a transistor audio amplifier stage 27. The audio output is then amplified in driver amplifier 28 and reproduced in speaker 30.

Noise signals appearing at decoupling point 33 of limiter 21 are applied through a low-pass filter, consisting of chokes 35 and 37 and capacitors 39 and 41, to the adjustable squelch control 43. These noise signals are applied to transistor squelch amplifier 45 which amplifies the noise signals and applies them through a voltage doubler network comprised of diodes 47 and 49 and capacitor 51. The doubled voltage is applied through the secondary of transformer 26 to the base of transistor 27 for biasing the same to cutoff. Thus, the noise signals appearing at decoupling point 33 will be amplified by transistor 45 to effectively squelch the audio output. In addition, intermediate frequency signals from the base 22 of the second limiter stage are applied to squelch amplifier 45 to squelch the audio when a signal is being received.

Audio frequency signals from the output of discriminator 23 are coupled through low pass filter 53 to one terminal of a switch 55. When switch 55 is in the position shown in the drawing, audio frequency signals from the discriminator will be applied to the base electrode of a first transistor 57. These signals are amplified in transistor 57 and applied to the base electrode of a second transistor 59. The output of transistor 59 is coupled to the base electrode of a third transistor 61 which is connected through resistor 63 to the driving coil 65 of a frequency responsive device. This device may consist of a vibratory reed 67 having a preselected resonant frequency at the frequency of the coded tone signal to be selected.

If the audio frequency signals amplified by transistors 57, 59 and 61 include a coded tone signal of the resonant frequency of reed 67, reed 67 will vibrate to engage contact 69 and apply voltage from voltage source 71 through resistor 72 to diode 73. Diode 73 is connected through capacitor 75 to the base of transistor 45 and forms a diode switch which, when forward biased by voltage from source 71, shunts the noise signals or intermediate frequency signals at the base of transistor 45 to cut off this transistor and thereby unsquelch the transistor audio stage 27. Thus, only upon receipt of a coded tone signal, will the receiver portion of the two-way radio unit be activated to reproduce the transmitted audio signal.

In the absence of a carrier signal, capacitors 79 and 81 act to bypass high frequency signals about low pass filter 53. Transistor 61 provides limiting action to permit this high frequency noise to override any transitory low frequency noise which, if amplified and applied to coil 65 might cause false closure of contact 69 even though a coded tone signal is not present. As carrier frequency is fed into the receiver, the high frequency noise bypassing the low pass filter 53 is quieted or diminished in magnitude and the low frequency signal may again take over. To further insure this, engagement of contact 69 by reed 67 applies forward bias to a diode switch 77, shunting the bypass circuit to prevent any high frequency noise from reaching the base of transistor 57.

Emitter bias for transistor 59 is provided through a low impedance path comprised of capacitor 83 and resistor 85. Resistor 85 is of relatively low value. A switch 87, which is ganged with switch 55, completes this low impedance path through resistor 85 from the emitter of transistor 59 to ground. Thus, transistors 57, 59 and 61, connected in cascade fashion, all function as grounded emitter amplifiers for driving the vibratory device when switches 55 and 87 are in the positions shown in the drawing.

The transmitter section of the unit is formed by oscillator 110 which applies high frequency signals to modulator 111. Microphone 112 applies audio signals to an audio circuit 113, also connected to modulator 111, for amplifying and processing the signals from microphone 112. The frequency modulated signals are applied to frequency multiplier 114 which brings them to the desired frequency and deviation and then to power amplifier 115 which raises the level to the desired value. The signals are applied to antenna 11 through switch 116 and transmitted. Switch 116 may be ganged with switch 55 and switch 87.

When it is desired to transmit, the coded tone signal is developed by converting the tone amplifier system into an oscillator. Vibratory device 67 is provided with a sensing coil 89 which produces an output at the frequency of vibration of reed 67. Coil 89 is coupled through a feedback circuit, including capacitor 91, to switch 55. When switch 55 is moved to transmit on encoder position, oscillations from coil 89 will be returned to the base of transistor 51 to provide the necessary oscillator feedback.

Code signals are derived from the oscillator by means of a variable tap 93 on potentiometer 95, which has a relatively high value compared to resistor 85, and which connects the emitter electrode of transistor 59 to ground. The output signal derived from variable tap 93 may be used to drive modulator 111 in the transmitting section of the radio unit. When switch 55 is moved to transmit on encoder position, switch 87 also moves with it, opening the circuit through resistor 85. Resistor 97 connects capacitor 83 to ground so that a bypass circuit for the emitter of transistor 59 is still present. Resistor 97, however, is of substantially higher value than resistor 85 so that the amount of bypass is relatively small, being just sufficient for a slight amount of collector gain but of negligible value to affect the output signal to the modulator 111. It should be noted therefore, that in encoder operation transistor 59 functions as a phase splitter of only minimal gain, so that the effect of tapping off the output to the transmitter modulator is negligible.

When switch 87 is moved to encoder position, direct current from source 71 momentarily flows through coil 65, resistor 99, capacitor 101 and diode 103 to ground. This initial current shocks the vibratory device 67 into oscillation. Sensing coil 89 applies these oscillations back to the base of transistor 57 through switch 55, from where they are amplified in transistors 57, 59 and 61 and reapplied to drive coil 65.

In addition to supplying the initial momentary flow of direct current to the coil 65, the diode network functions as a delayed automatic gain control system. Bias voltage from source 71 is applied through resistor 105 to capacitor 107. The time constants of resistor 105 and capacitor 107 are selected to permit sufficient time to elapse for the oscillator to reach amplitudes of usable value. Then, as capacitor 107 reaches full charge, forward bias is applied to diodes 109 and 103. This reduces the impedance of diode 103 to shunt the output of transistor 61 from drive coil 65, reducing the driving current in coil 65. Such a delayed automatic gain control permits the amplitude of vibrations in the oscillator to reach a usable level quickly, and yet prevents them from going beyond the capabilities of the circuit components.

It may therefore be seen that the invention provides a dependable and simple combination encoder-decoder unit for a two-way radio adapted for coded tone operation. A switching arrangement allows conversion of the circuit from encoder to decoder operation in a single throw, and the circuit utilizes substantially the same elements for both modes of operation, simplifying use and reducing cost.

We claim:

1. In a two-way radio unit adapted for coded tone operation and having a receiver with a portion for detecting received signals, an encoder-decoder system including in combination, a frequency responsive vibratory device having drive means and sensing means and resonant at a predetermined frequency, a driver amplifier comprising a plurality of amplifier stages connected to said drive means, one of said amplifier stages including a transistor having an emitter network connected thereto, said emitter network including resistance means in parallel with a bypass path including capacitance means, a feedback circuit connected to said sensing means, and switch means connected to said amplifier for seletively connecting the same to said feedback circuit and to the detector portion of the receiver, said switch means connecting said feedback circuit to provide oscillations at said predetermined frequency so that said system operates as an encoder to produce tone signals, said switch means applying received signals to said driver amplifier so that said vibratory device responds to a received signal of said predetermined frequency to provide decoder operation, automatic gain control means connected to said driver amplifier for controlling the gain thereof, said switch means having provision for cutting out said automatic gain control means during decoder operation, said switch means having further provision for changing the connection of said bypass path to increase the impedance of said emitter network to a relatively high value compared to the value thereof during encoder operation, and means connected to said resistance means for deriving an output tone of the frequency of said vibratory device from said emitter network without appreciably affecting the operation of said transistor.

2. In a two-way radio unit adapted for coded tone operation and having a receiver with a portion for detecting received signals, an encoder-decoder system including in combination, frequency selective means having drive means and sensing means and resonant at a predetermined frequency, a driver amplifier connected to said drive means for applying signals thereto, said driver amplifier comprising first, second and third cascaded grounded emitter transistors, said third transistor having a collector electrode connected to said drive means, an emitter bias network for said second transistor including a first resistor connecting the emitter electrode of said second transistor to ground and a series connected capacitor and second resistor connected in parallel with said first resistor, a third resistor connected to the juncture between said capacitor and said second resistor, said third resistor having a value substantially lower than the value of either said first or second resistors and being adapted to provide a low impedance path from the emitter electrode of said second transistor and said capacitor to ground, a feedback circuit connected to said sensing means, switch means connected to said amplifier for selectively connecting the same to said feedback circuit and to the detector portion of the receiver, said switch means connecting said feedback circuit so that said system operates as an encoder to produce tone signals at said predetermined frequency, said switch means applying received signals to said amplifier and to said frequency selective means so that said system responds to received signals of said predetermined frequency to provide decoder operation, a diode-capacitor network connected to said collector electrode of said third transistor for shunting current therefrom, said switch means having provision for selectively connecting said third resistor and said diode capacitor network to ground to provide for decoder and encoder operation respectively, and a variable tap on said resistance means for deriving an output tone of said predetermined frequency from said emitter bias network without appreciably affecting operation of said transistor.

3. In a two-way radio unit adapted for coded tone operation and having selective means responsive to a predetermined frequency and further having conductor means therein carrying received audio signals, an amplifier for such selective means, including in combination, a plurality of successive amplifying stages with the last of said successive amplifying stages being connected to drive the selective means, one of said stages being a transistor having an emitter bias network connected thereto, said bias network including resistance means connected in parallel with a by-pass capacitance-resistance series path, switch means connected to the first of said successive amplifying stages and having a first position connecting the conductor means in the radio unit thereto and a second position connecting the selective means thereto for performing decoder and encoder functions respectively, said switch means having provision for increasing the resistance in said capacitance resistance series path when in said second position, and a variable tap on said resistance means for deriving a tone signal from said emitter bias network without appreciably affecting operation of said transistor.

4. In a two-way radio unit adapted for coded tone operation and having a single frequency vibratory device and further having conductor means therein carrying received audio signals, a driver amplifier for such device, including in combination, first, second and third grounded emitter transistor amplifying stages connected to drive the vibratory device, a bias network connected to said second transistor and including a first resistor connecting the emitter electrode of said second transistor to ground, a second resistor connected to ground and a capacitor connecting the emitter of said second transistor to the ungrounded end of said second resistor to form a current path parallel with said first resistor, a third resistor of relatively low value compared with said first and second resistors connecting the juncture between said capacitor and said second resistor to ground whereby said capacitor and said third resistor provide a low impedance path to ground for the emitter of said second transistor, an input conductor for said amplifier, switch means connected to said input conductor and having first and second positions, said switch means operable in said first position to connect to the conductor means in the radio unit and operable in said second position to connect to the vibratory device for performing both decoder and encoder functions respectively, said switch means having means for selectively opening the connection between said third resistor and ground to short circuit the low impedance path from the emitter of said second transistor when in said second position, and a variable tap on said first resistor for deriving an output tone of the frequency of said vibratory device from said emitter bias network without appreciably affecting operation of said second transistor.

5. A two-way radio unit adapted for coded tone operation, including in combination, receiver means having a portion for detecting received signals and an audio amplifier coupled thereto, a squelch circuit coupled to said audio amplifier for controlling the conductivity thereof in response to a control signal, a frequency responsive vibratory device having drive means and sensing means and resonant at a given frequency, an amplifier comprising first, second and third cascaded grounded emitter transistors connected to drive said drive means, contact means operable by said vibratory device to control the application of a control signal to said squelch circuit, a feedback circuit connected to said sensing means, and switch means connected to said driver amplifier for selectively connecting the same to said feedback circuit and to said detector portion, said switch means connecting said feedback circuit to provide oscillations at said predetermined frequency so that said driver amplifier together with said vibratory device operate as an encoder to produce tone signals, said switch means applying received signals to said driver amplifier and from thence to said vibratory device so that said system provides decoder operation.

6. A combination encoder-decoder device for use in selective signaling two-way radio apparatus, which apparatus utilizes a tone signal for transmitter operation and is responsive to a control signal for receiver operation, said device including in combination, an amplifier having input and output conductors, an electro-mechanical frequency responsive unit including a driving coil, a sensing coil and mechanical vibratory means coupling said driving coil to said sensing coil and responsive to a predetermined frequency, means connecting said output conductor of said amplifier to said driving coil, means responsive to vibration of said vibratory means at the predetermined frequency upon energization of said driving coil by a tone signal of the predetermined frequency from said amplifier to produce a control signal for the radio apparatus, and switch means selectively operable to couple said sensing coil to said input conductor of said amplifier to cause said device to oscillate at the predetermined frequency and produce a tone signal for the apparatus.

7. A combination encoder-decoder device for use in selective signaling two-way apparatus, which apparatus utilizes a tone signal for transmitter operation and is responsive to a control signal for receiver operation, said device including in combination, an amplifier having input and output conductors, an electro-mechanical frequency responsive unit including driving means, sensing means and mechanical vibratory means coupling said driving means to said sensing means and responsive to a predetermined frequency, means connecting said output conductor of said amplifier to said driving means, means responsive to vibration of said vibratory means at the predetermined frequency upon energization of said driving means by a tone signal of the predetermined frequency from said amplifier to produce a control signal for the radio apparatus, switch means selectively operable to couple said sensing means to said input conductor of said amplifier to cause said device to oscillate at the predetermined frequency and produce a tone signal for the apparatus, gain control means connected to said amplifier for controlling the gain thereof, said gain control means being responsive to applied direct current voltage to reduce the output of said amplifier, said switch means including means for applying direct current voltage to said gain control means when said sensing means is coupled to said input conductor of said amplifier, said gain control means acting after a delay period during which oscillations at said output conductor of said amplifier reach a predetermined level to reduce the signal applied by said output conductor to said driving means.

8. A combination encoder-decoder device for use in selective signaling two-way apparatus, which apparatus utilizes a tone signal for transmitter operation and is responsive to a control signal for receiver operation, said device including in combination, an amplifier having input and output conductors, an electro-mechanical frequency responsive unit including driving means, sensing means, and mechanical vibratory means coupling said driving means to said sensing means and responsive to a predetermined frequency, means connecting said output conductor of said amplifier to said driving means, means responsive to vibration of said vibratory means at the predetermined frequency upon energization of said driving means by a tone signal of the predetermined frequency from said amplifier to produce a control signal for the radio apparatus, switch means selectively operable to couple said sensing means to said input conductor of said amplifier to cause said device to oscillate at the predetermined frequency and produce a tone signal for the apparatus, a source of direct current potential, gain control means connected to said output conductor of said amplifier, said gain control means including capacitance means for developing a bias voltage to reduce the gain of said amplifier, resistance means connecting said capacitance means to said source for changing the bias voltage across said capacitance means, said resistance means and said capacitance means providing a time delay for the application of bias voltage from said source of potential to reduce the gain of said amplifier means.

References Cited by the Examiner

UNITED STATES PATENTS

| | | | |
|---|---|---|---|
| 1,708,945 | 4/1929 | Horton | 333—71 |
| 2,113,365 | 4/1938 | Artzt | 331—156 |
| 2,147,492 | 2/1939 | Mead | 331—156 |
| 2,421,468 | 6/1947 | Singer | 250—199 |
| 2,599,097 | 6/1952 | Entz et al. | 325—64 X |
| 3,138,755 | 6/1964 | Kompelien | 325—64 X |

FOREIGN PATENTS

| | | |
|---|---|---|
| 759,581 | 3/1954 | Germany. |

DAVID G. REDINBAUGH, *Primary Examiner.*

J. W. CALDWELL, *Assistant Examiner.*